United States Patent [19]

Peersch

[11] 3,769,596

[45] Oct. 30, 1973

[54] OSCILLATION DETECTION CIRCUIT

[75] Inventor: George H. Peersch, Randolph Township, Morris County, N.J.

[73] Assignee: The Bendix Corporation, Teterboro, N.J.

[22] Filed: Mar. 2, 1972

[21] Appl. No.: 231,187

[52] U.S. Cl. .................. 328/138, 307/225, 307/229

[51] Int. Cl. ............................................ H03d 3/04

[58] Field of Search ..................... 328/138; 307/225, 307/229

[56] References Cited

UNITED STATES PATENTS

| | | | |
|---|---|---|---|
| 3,099,800 | 7/1963 | Vinson et al. | 328/138 X |
| 3,187,202 | 6/1965 | Case | 328/138 X |
| 3,305,732 | 2/1967 | Grossman et al. | 328/138 X |
| 3,383,605 | 5/1968 | Davidoff | 328/138 |
| 3,539,827 | 11/1970 | Crowe | 328/138 X |
| 3,638,038 | 1/1972 | Weber | 328/138 X |

*Primary Examiner*—John S. Heyman
*Attorney*—Anthony F. Cuoco et al.

[57] ABSTRACT

A circuit detects those oscillations of an input signal that fall within a predetermined frequency band. An output is provided in the form of a logic signal commensurate with the detected oscillations.

7 Claims, 1 Drawing Figure

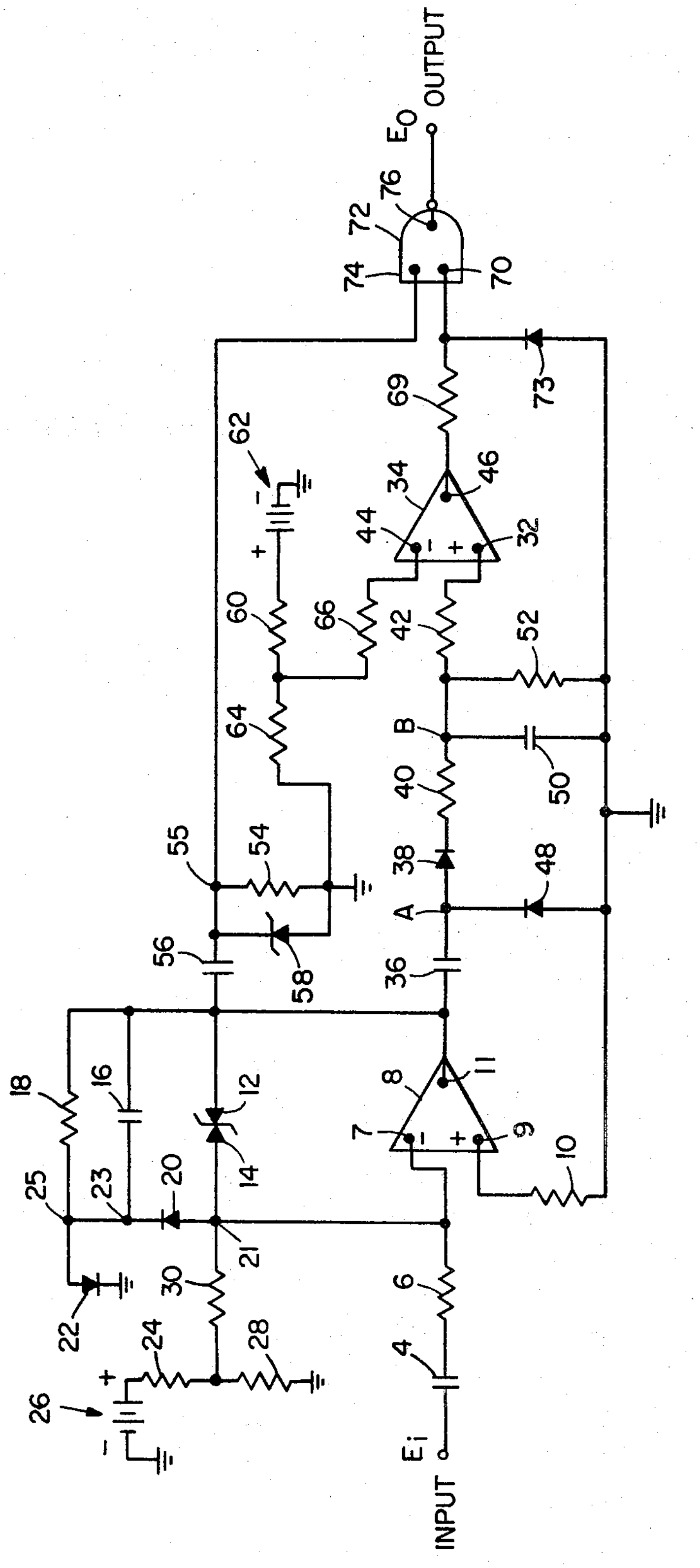
OUTPUT
INPUT

OSCILLATION DETECTION CIRCUIT

BACKGROUND OF THE INVENTION

1. Field of the Invention

This invention relates generally to oscillation detection circuits and particularly to circuits of the type which detect oscillations that fall within a predetermined frequency band.

2. Description of the Prior Art

Off line adaptive computers for aircraft control systems require means for reducing the controlled loop gain when an unstable signal oscillation develops that is below levels which will allow the computer to perform its intended function. In order to accomplish this, the undesirable oscillations must first be detected.

SUMMARY OF THE INVENTION

This invention contemplates an oscillation detection circuit including means for counting the zero crossings of an input signal and means for rejecting all such crossings that fall outside a desired frequency band. A pulse output is generated for each zero crossing of the input signal and means are provided for setting the minimum and maximum frequencies of the frequency band.

One object of this invention is to provide circuitry for detecting those oscillations of an input signal that fall within a predetermined frequency band.

Another object of this invention is to provide a time weighting function that sets the minimum frequency of the frequency band.

Another object of this invention is to provide means for setting the maximum frequency of the frequency band.

Another object of this invention is to provide a logic output signal commensurate with the detection of the desired oscillations.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWINGS

The single figure in the drawing is an electrical-schematic diagram of a device according to the invention.

DESCRIPTION OF THE INVENTION

An input signal $E_i$ is applied through a capacitor 4 and a resistor 6 to an inverting input terminal 7 of a conventional type operational amplifier 8. Amplifier 8 has a non-inverting input terminal 9 connected to ground through a resistor 10 and has an output terminal 11.

Zener diodes 12 and 14 are connected in common cathode configuration to inverting input terminal 7 and to output terminal 11 of amplifier 8. A capacitor 16 and a resistor 18 are connected in parallel with zener diodes 12 and 14. A diode 20 is connected to zener diode 14 at a point 21 and to capacitor 16 at a point 23. A grounded diode 22 is connected to capacitor 16 at point 23 and is connected to resistor 18 at a point 25.

A resistor 24 is connected to a suitable source of positive direct current shown as a battery 26 and a grounded resistor 28 is connected in series with resistor 24. A resistor 30 is connected between resistors 24 and 28 and is connected to point 21.

Output terminal 11 of amplifier 8 is connected to a non-inverting input terminal 32 of a conventional type amplifier 34 through a capacitor 36, a diode 38, a resistor 40 and another resistor 42. Amplifier 34 has an inverting input terminal 44 and an output terminal 46.

A diode 48 is connected between capacitor 36 and diode 38 at a point A and is connected to ground. A capacitor 50 is connected between resistor 40 and resistor 42 at a point B and is connected to ground. A resistor 52 is connected between resistors 40 and 42 in parallel with capacitor 50.

Zener diode 12 is connected to a grounded resistor 54 through a capacitor 56. A grounded zener diode 58 is connected between capacitor 56 and resistor 54.

A resistor 60 is connected to a suitable source of positive direct current shown as a battery 62 and is connected to a grounded resistor 64. A resistor 66 is connected between resistors 60 and 64 and is connected to inverting input terminal 44 of amplifier 34.

Output terminal 46 of amplifier 34 is connected through a resistor 69 to an input terminal 70 of a logic gate 72. A diode 73 is connected between resistor 69 and input terminal 70 and is connected to ground. Logic gate 72 has another input terminal 74 connected to resistor 54 at a point 55 and an output terminal 76 at which an output signal $E_0$ is provided.

OPERATION

Capacitor 4 and resistor 6 provided a high pass filter through which input signal $E_i$ is applied to a limited high gain amplifying system including amplifier 8 and zener diodes 12 and 14. The output of amplifier 8 at output terminal 11 is a square wave of the same frequency as input signal $E_i$ oscillating between limit voltages which may be, for purposes of illustration, $\pm$ 10V as determined by zener diodes 12 and 14. In this connection it is to be noted that input signal $E_i$ is derived from a source that is most sensitive to oscillations. For an off line adaptive computer for aircraft control purposes this signal is provided by an aircraft control surface position sensor.

The square wave output from amplifier 8 is converted to a positive pulse at point A through the arrangement of capacitor 36 and diodes 38 and 48. The pulses are then counted by an integrating network including resistor resistor 40 and capacitor 50 to provide a signal at point B which is proportional to the number of positive pulses at point A. A voltage divider network including resistors 60, 64 and 66 determines the threshold voltage at which the signal at point B will cause amplifier 34, originally saturated in one sense, to switch over to saturation in the opposite sense.

Integrating capacitor 50 in cooperation with resistor 52 provides a time lag ($\tau$) which corresponds to a time weighting function of the pulses at point A. If the pulses are not provided at a fast enough rate, the voltage which charges capacitor 50 decays so that the threshold of amplifier 34 is not reached. Thus, the time constant ($\tau$) controls the minimum frequency of the desired band of frequencies for which output signal $E_0$ is desired.

The maximum frequency of the desired frequency band is controlled by the non-linear network around amplifier 8 including capacitor 16, resistor 18, diodes 20 and 22 and the voltage divider circuit including resistors 24, 28 and 30.

Thus, it will be seen that capacitor 16 controls the output of amplifier 8 to ramp negative at a given rate while diodes 20 and 22 allow the amplifier output to reach its positive limit immediately. High frequency inputs then will not allow the amplifier output to reach a negative value and the pulses provided at point A will not be effective to cause the integrator including resistor 40 and capacitor 50 to count pulses. No pulses will occur at point B if the input frequency is too high and thereforeno output will occur. The signal at point B will not trip amplifier 34 if the frequency is not high enough, and no output will occur in this case as well. The circuit including capacitor 56, resistor 54 and zener diode 58 provides an output pulse with each zero crossing for frequencies below the maximum frequency. This signal is applied to gate 72 with the weighted output of amplifier 34 to provide a pulse for each cycle of the oscillations above a given number (approximately 4). The gated pulse ceases immediately upon cessation of oscillation.

It will now be seen that the time weighted function provided by capacitor 50 and resistor 52 sets the minimum frequency of the desired band of frequencies. The maximum frequency is provided by amplifier 8 in cooperation with capacitor 16, resistor 18 and diodes 20 and 22. A pulse output with each zero crossing is generated by capacitor 56, resistor 54, zener diode 58 and gate 72.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A circuit for detecting oscillations of an input signal provided by an input signal means and which fall within a predetermined frequency band, comprising:

means connected to the input signal means and responsive to the input signal therefrom for providing a signal having a predetermined wave form and oscillating at the same frequency as the input signal, and including a high pass filter connected to the input signal means for filtering the input signal and an operational amplifier connected to the filter and responsive to the filtered signal for providing the predetermined wave form signal oscillating at the same frequency as the input signal;

means connected to the predetermined wave form signal means for converting the signal therefrom to pulses of a predetermined sense, and including a capacitor connected to the operational amplifier, a current flow control device connected to the capacitor and another current flow control device connected between the capacitor and the first mentioned current flow control device at a point at which the pulses are provided;

means connected to the converting means for counting the pulses therefrom and for providing a signal corresponding to the number of said pulses;

means connected to the predetermined wave form signal means for setting the maximum frequency of the predetermined frequency band;

means connected to the pulse counting means for setting the minimum frequency of the predetermined frequency band; and means connected to the maximum and minimum frequency setting means for providing an output commensurate with the detected oscillations.

2. A circuit as described by claim 4, wherein the means connected to the converting means for counting the pulses therefrom and for providing a signal corresponding to the number of said pulses includes:

integrating means having a resistor connected to the second mentioned current flow control device and a capacitor connected to the resistor at a point at which the signal corresponding to the number of pulses is provided.

3. A circuit as described by claim 2, wherein the means connected to the pulse counting means for setting the minimum frequency of the predetermined frequency band includes:

a resistor connected in parallel with the integrator capacitor and cooperating with said capacitor to provide a predetermined circuit time constant;

an operational amplifier connected to the integrating means and to the resistor, said operational amplifier being initially saturated in one sense and affected by a threshold signal applied thereto from the integrating means for switching to saturation in the opposite sense; and the time constant affecting the circuit to determine whether or not the threshold voltage is reached.

4. A circuit as described by claim 1, wherein the means connected to the predetermined wave form signal means for setting the maximum frequency of the predetermined frequency band includes:

a capacitor connected in feedback relation to the operational amplifier for controlling the amplifier to ramp in one sense at a predetermined rate;

current flow control means connected to the capacitor for affecting the amplifier to instantaneously reach its output limit in the opposite sense; and a voltage divider network connected to the current flow control means.

5. A circuit as described by claim 3, including:

a voltage divider network connected to the operational amplifier for controlling the threshold voltage.

6. A circuit as described by claim 3, wherein the means connected to the predetermined wave form signal means for setting the maximum frequency of the predetermined frequency band includes:

a capacitor connected in feedback relation to the operational amplifier for controlling the amplifier to ramp in one sense at a predetermined rate;

current flow control means connected to the capacitor for affecting the amplifier to instantaneously reach its output limit in the opposite sense; and a voltage divider network connected to the current flow control means.

7. A circuit as described by claim 6, wherein the means connected to the maximum and minimum frequency setting means for providing an output includes:

a circuit connected to the feedback capacitor and including a capacitor, a current flow control device and a resistor connected in parallel and connected to the capacitor, said circuit providing an output pulse with each zero crossing of the input signal; and a gate connected to said circuit and connected to the operational amplifier connected to the integrator and responsive to the output pulse and the amplifier output for providing an output for each cycle of oscillation above a given number.

* * * * *

UNITED STATES PATENT OFFICE
CERTIFICATE OF CORRECTION

Patent No. 3,769,596 Dated October 30, 1973

Inventor(s) George H. Pfersch

It is certified that error appears in the above-identified patent and that said Letters Patent are hereby corrected as shown below:

On the cover sheet item [75] the inventor's name should read as follows: -- George H. Pfersch --.

Signed and sealed this 30th day of April 1974.

(SEAL)
Attest:

EDWARD M.FLETCHER,JR.
Attesting Officer

C. MARSHALL DANN
Commissioner of Patents